No. 767,467. PATENTED AUG. 16, 1904.
G. M. WRIGHT.
CULTIVATOR.
APPLICATION FILED MAR. 31, 1904.
NO MODEL. 2 SHEETS—SHEET 2.
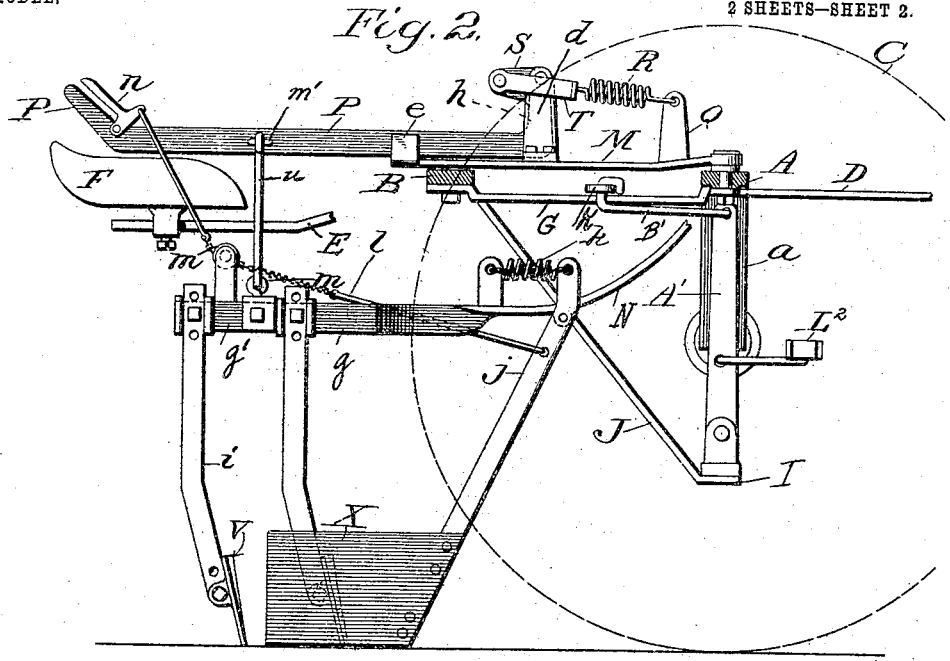
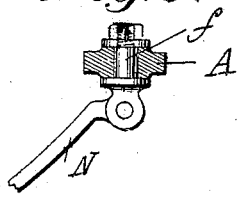
Witnesses
Inventor
G. M. Wright.
by James J. Sheehy Attorney No. 767,467.                                              Patented August 16, 1904.

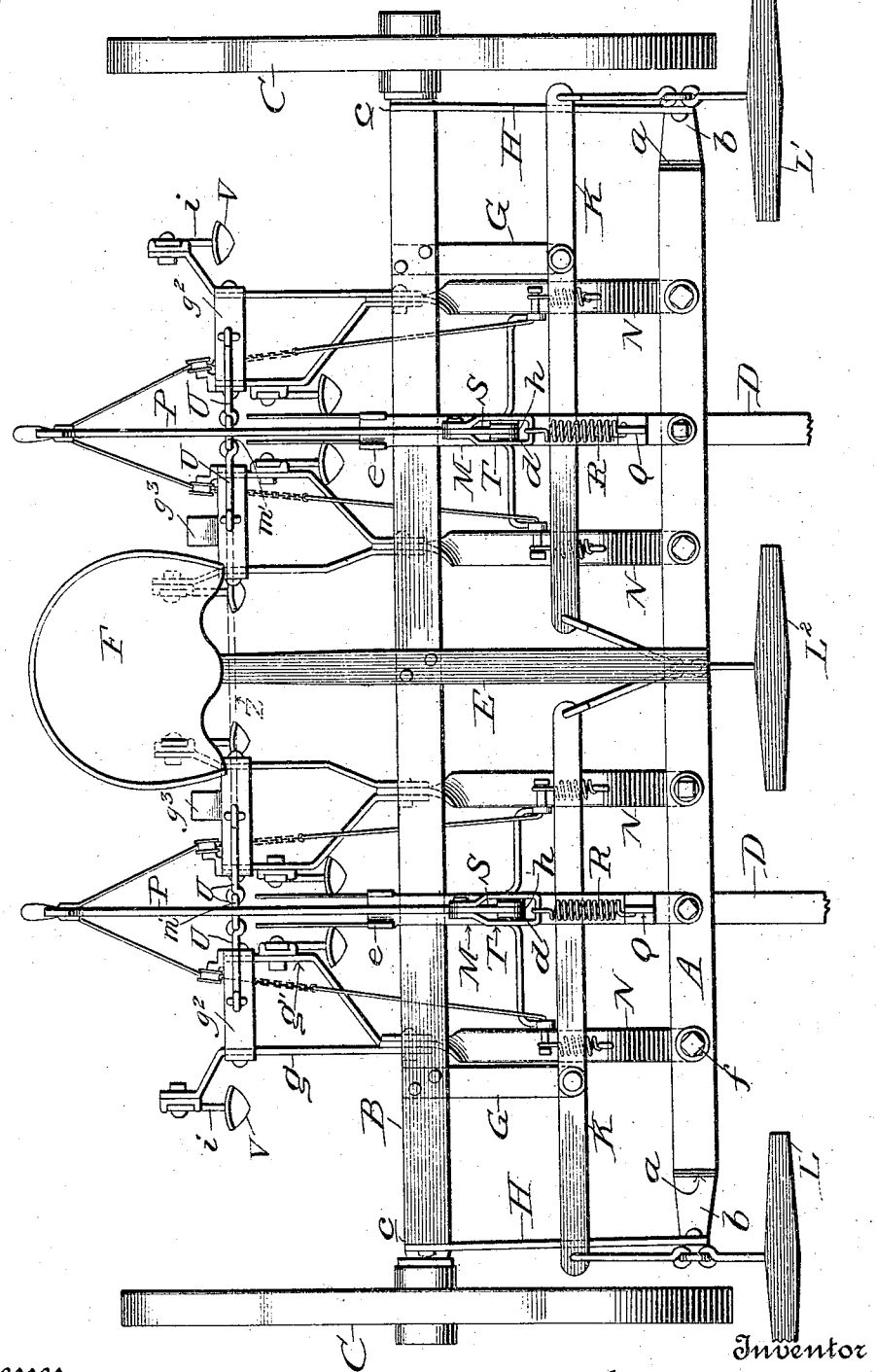

UNITED STATES PATENT OFFICE.

GENERAL M. WRIGHT, OF BEE, NEBRASKA.

CULTIVATOR.

SPECIFICATION forming part of Letters Patent No. 767,467, dated August 16, 1904.

Application filed March 31, 1904. Serial No. 200,961. (No model.)

*To all whom it may concern:*

Be it known that I, GENERAL M. WRIGHT, a citizen of the United States, residing at Bee, in the county of Seward and State of Nebraska, have invented new and useful Improvements in Cultivators, of which the following is a specification.

My invention pertains to cultivators; and it has for one of its objects to provide a simple and inexpensive cultivator embodying no delicate parts, such as are likely to get out of order after a short period of use, and one adapted to be used to advantage in working check-row corn as well as listed corn, and which is highly efficient in operation and is susceptible of being adjusted incident to such operation as necessity demands, with but a minimum amount of effort on the part of the driver.

Another object of the invention is to provide a cultivator which by reason of its construction is very easy of draft.

With the foregoing in mind the invention will be fully understood from the following description and claims when taken in connection with the accompanying drawings, forming part of this specification, in which—

Figure 1 is a plan view of the cultivator constituting the present and preferred embodiment of my invention. Fig. 1$^a$ is a view of the rod employed to connect the two pairs of swinging beams embraced in my novel cultivator when the cultivator is to be used for working check-row corn, the said rod being removed, as shown in Fig. 1, when the cultivator is to be used to work listed corn. Fig. 2 is a vertical sectional view of the cultivator with the seat-carrying bar partly broken away. Fig. 3 is an enlarged detail section illustrative of the universal connection which I prefer to employ between each of the swinging beams and the main frame of the cultivator.

Similar letters of reference designate corresponding parts in all of the views of the drawings.

The main frame of my novel cultivator is preferably made of metal and comprises a front cross-bar A, having depending portions *a* at its ends, which terminate in outwardly-directed arms *b*, Fig. 1; a rear cross-bar B, having at its ends depending portions *c*, which carry at their lower ends short axles on which supporting-wheels C are mounted; thills D, fixedly connected to the bars A and B and extending forwardly from the latter; a bar E, fixedly connected to the bars A and B at the middles thereof and extending rearwardly from the bar B and bearing a driver's seat F; arms G, fixedly connected to and extending forwardly from the bar B at points adjacent to the ends thereof; oblique braces H, interposed between and connecting the depending portions *c* of the bar B and the arms *b* of the bar A; a U-shaped strap I, connected to and depending from the bar A, and a brace J, interposed between and connecting the lower portion of said strap and the bar B. The seat F is preferably adjustable fore and aft on the bar E, Fig. 2.

K K are horizontally-disposed levers fulcrumed on the arms G of the main frame and having long inner arms and short outer arms; L, a swingletree connected to the short arm of one of the levers K; L', a swingletree connected with the short arm of the other lever K, and L$^2$ a swingletree connected with the long arms of both of the levers K. The swingletrees are for the connection of the animals used to draw the cultivator, and in virtue of the middle draft-animal being hitched to the cultivator through the medium of the draft-equalizing means just described it will be observed that the draft is distributed equally between the three animals, the middle animal pulling on the long arms of the levers K, and hence exerting greater leverage than the outer animals, each of which pulls on the short arm of one of the said levers.

M M are horizontally-disposed and movable bars pivoted to the frame A at opposite sides of the middle thereof and movable on the frame-bar B and having standards *d* and also having upwardly-directed lugs *e*.

N N are swinging beams connected, preferably, through the medium of universal connections *f* to the frame-bar A and extending downwardly and rearwardly therefrom and terminating in diverging arms *g g'*; P P, vertically-movable hand-levers having upwardly-extending forward portions fulcrumed at their upper ends in the standards *d* and provided at said ends with rearwardly-directed arms S; Q Q, uprights rising from the forward portions of the bars M; R R, coiled springs connected to said uprights; T T, links connecting the arms S of levers P and the springs R; U U, diverging connections between each of the levers P and the diverging arms $g$ $g'$ of shovels being raised or lowered as conditions require.

The arms $g$ of the swinging beams N extend rearwardly of the arms $g'$, and hence the shovels carried by the arms $g$ are arranged as shown in Fig. 1 in relation to the shovels carried by the arms $g'$—i. e., are arranged at points in rear of the transverse plane in which the latter shovels are disposed. The arms $g$ $g'$ are connected by cross-bars $g^2$, and the cross-bars $g^2$ of the inner beams N bear foot-rests $g^3$.

In virtue of the construction described in the foregoing it will be observed that when the levers P are raised to lift the shovels out of the ground the springs R will assist in such operation, and hence but a minimum amount of effort on the part of the driver is necessary; also, that said springs serve when the levers P are in the position shown in Fig. 2 to hold the shovels in the ground, this because of the springs, the links T and the points of connection of said links to the arms S of the levers P resting in dead-centers after the manner shown in Fig. 2. It will be further observed that when the levers P are oscillated vertically in the manner and for the purpose stated said levers will move independently of the horizontally-movable bars M. When, however, the levers P are moved laterally to accommodate the shovels to irregularities in rows of corn—listed corn, for instance—the levers P will move with the bars M. From this it follows that the springs R will perform the functions heretofore ascribed to the same irrespective of the positions of the levers P relative to the main frame. In enabling the driver to conveniently guide the shovels the levers P are assisted by foot-rests W, arranged on the inner arms $g$ and designed for the engagement of the feet of the driver.

In addition to the advantages ascribed to the construction described in the foregoing it will be noticed that through the medium of the two levers P, disposed at opposite sides of the driver's seat and within convenient reach of the driver, he is enabled to conveniently and quickly adjust four pairs of shovels.

X X are guards, one of which is employed in connection with each of the four forward shovels V. The said guards are used when corn is plowed for the first time and are designed to prevent the forward shovels from throwing dirt on the corn and yet let enough dirt down to cover up grass and weeds. Said guards are respectively connected to one of the swinging beams N by a lever $j$, fulcrumed at an intermediate point of its length on the beam, as best shown in Fig. 2. The upper arm of said lever is connected to the beam N through the medium of a coiled spring $k$, while the lower arm is connected through the medium of a cable $l$, passed under a sheave $m$ to an auxiliary hand-lever $n$, fulcrumed on one lever P adjacent to the handle thereof. The guards X of the beams N comprised in each pair are connected through the medium of the means described with the hand-lever $n$ on the lever P complementary to said pair of beams, as shown in Fig. 1, and hence when one of the levers $n$ is depressed it will be observed that the guards complementary to said lever will be raised against the action of the springs $k$. The guards are raised, as stated, when considerable weeds are reached in order to prevent the guards from interfering with the covering of the weeds with dirt. The springs $k$ have for their purpose to yieldingly hold the guards X down to their work, or, in other words, in the position shown in Fig. 2.

When corn that is grown to a considerable height above the ground is to be worked, the guards X and their appurtenances may be, and preferably are, removed from the cultivator.

The cultivator, as shown in Fig. 1, is adapted to work listed corn, and hence the levers P are movable independently of each other and with their respective shovels. When, however, check-row corn is to be worked, said levers are connected through the medium of the rod Z, Fig. 1$^a$, so as to move together. The rod Z is detachably connected to eyes $m'$ on the levers P, and when it is not desired to use said rod, as when listed corn is to be worked, the same may be removed from the cultivator and stored in a barn or other suitable place.

As best shown in Fig. 2, the middle singletree L$^2$ is connected to the long arms of the levers K through the medium of a lever A', fulcrumed on the lower portion of the U-shaped strap I, and links B', interposed between the upper portion of the said lever and the said arms of the levers K. In virtue of the employment of the said lever A' the leverage which the middle draft-animal is enabled to exert is obviously increased, and hence the middle draft-animal is enabled to pull with and keep up with the outer draft-animals.

Notwithstanding the practical advantages possessed by my novel cultivator as pointed out in the foregoing, it will be appreciated that the cultivator is strong and durable in construction and is no more expensive than the ordinary cultivators extant.

I have entered into a detailed description of the construction and relative arrangement of the parts embraced in the present and preferred embodiment of my invention in order to impart a full, clear, and exact understanding of the same. I do not desire, however, to be understood as confining myself to such specific construction and relative arrangement of parts, as such changes or modifications may be made in practice as fairly fall within the scope of my invention as claimed.

Having described my invention, what I claim, and desire to secure by Letters Patent, is—

1. In a cultivator, the combination of a wheel-supported main frame, a horizontally and vertically swinging beam carrying one or more shovels and connected to the main frame, a horizontally-swinging bar connected to the main frame, a lever fulcrumed on said bar and arranged to swing vertically thereon, a connection between said lever and the beam, and a spring interposed between and connected with the swinging bar and the lever and arranged, when the lever is in its lowermost position, to rest in a dead-center with its point of connection to the lever and the fulcrum of said lever.

2. In a cultivator, the combination of a wheel-supported main frame, a horizontally and vertically swinging beam carrying one or more shovels and connected to the main frame, a horizontally-swinging bar connected to the main frame and having upwardly-extending lugs, a lever fulcrumed on the horizontally-swinging bar and having the upwardly-extending portion $h$ and the rearwardly-extending arm S, a connection between the beam and said lever, a spring connected to an upright portion on the horizontally-swinging bar, and a link connecting said spring and the arm S of the lever.

3. In a cultivator, the combination of a wheel-supported main frame, a horizontally and vertically swinging beam carrying one or more shovels and connected to the main frame, a horizontally-swinging bar connected to the main frame, a lever mounted on said bar and arranged when moved laterally or horizontally to engage and move the bar, and also arranged to swing vertically independent of the bar, and a connection between the said lever and the beam.

4. In a cultivator, the combination of a main frame, a horizontally and vertically swinging beam carrying one or more shovels and connected to the main frame, a horizontally-swinging bar connected to the main frame, a lever mounted on said bar and arranged when moved horizontally to engage and move the bar, and also arranged to swing vertically independent of the bar, a connection between the said lever and the beam, and a spring interposed between and connected with the bar and the lever.

5. In a cultivator, the combination of a main frame, horizontally and vertically swinging beams carrying shovels and connected to the main frame, a horizontally-swinging bar connected to the main frame, a lever mounted on said bar and arranged when moved laterally or horizontally to engage and move the bar, and also arranged to swing vertically independent of the bar, connections between the said lever and the beams, and a spring interposed between and connected with the bar and the lever.

6. In a cultivator, the combination of a main frame, a driver's seat mounted thereon, pairs of horizontally and vertically swinging beams connected to the main frame at opposite sides of the seat, a horizontally-swinging bar complementary to each pair of beams; said bars being connected at their forward ends to the main frame, levers mounted on said bars and arranged when moved horizontally to engage and move the bars, and also arranged to swing vertically independent of the bars, connections between one lever and one pair of beams, connections between the other lever and the other pair of beams, and springs interposed between and connected with the levers and their respective bars.

7. In a cultivator, the combination of a main frame, a driver's seat mounted thereon, pairs of horizontally and vertically swinging beams carrying shovels, connected to the main frame at opposite sides of the seat, a horizontally-swinging bar complementary to each pair of beams; said bars being connected at their forward ends to the main frame, levers mounted on said bars and arranged when moved horizontally to engage and move the bars, and also arranged to swing vertically independent of the bars, a rod detachably connected with the levers and extending between the same, connections between one lever and one pair of beams, connections between the other lever and the other pair of beams, and springs interposed between and connected with the levers and their respective bars.

8. In a cultivator, the combination of a main frame, a vertically-swinging beam connected therewith and carrying one or more shovels, a lever movable vertically and connected with the main frame and the beam and having a rearwardly-extended arm, and a spring interposed between and connected with the arm of the lever and the main frame.

In testimony whereof I have hereunto set my hand in presence of two subscribing witnesses.

GENERAL M. WRIGHT.

Witnesses:
W. B. THORPE,
CALVIN W. NOXON.